Patented Dec. 22, 1942

2,306,185

UNITED STATES PATENT OFFICE 2,306,185

ORGANIC COMPOUNDS AND PROCESS OF PREPARING THE SAME

Josef Pikl, Pitman, N. J., assignor to E. I. du Pont de Nemours & Company, Wilmington, Del., a corporation of Delaware No Drawing. Application October 25, 1940, Serial No. 362,790

13 Claims. (Cl. 260—404)

This invention relates to novel organic compounds and to processes for preparing the same. More particularly, this invention deals with new methylol amide compounds derived from secondary amides of higher fatty acids.

Methylol compounds of primary amides, that is compounds of formula R—CONH—CH₂OH, are old compounds. Their first preparation was described by Einhorn in Annalen, vol. 343. Compounds of the same series wherein R is a long-chain alkyl compound are also described in British Patent No. 463,300 and in U. S. Patents Nos. 2,146,392 and 2,212,654. These processes generally involve the treatment of an amide of the formula R—CONH₂ with formaldehyde in the presence of an alkaline reagent, such as K₂CO₃, NaOH or pyridine. Unfortunately, however, the above method has been found inapplicable to secondary amides, that is compounds of formula R—CONH—R', where R' is alkyl. Experiments to produce methylol amides of secondary long-chain acyl amides by reacting with formaldehyde and an alkaline reagent, gave negative results.

It is accordingly an object of this invention to provide a process for preparing N-methylol derivatives of secondary acyl amides. It is a further object of this invention to produce as novel compounds N-methylol derivatives of secondary long-chain acyl amides, and to test their adaptability for use in imparting water-repellency to textile fiber. Further important objects of this invention, will appear as the description proceeds.

These objects of my invention are accomplished generally by reacting the N-methylene halide of a secondary amide with a slightly moist inorganic alkaline reagent in an organic solvent. More particularly, I react with an alkaline reagent and water upon a secondary amide of the general formula

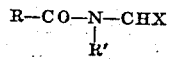

wherein R is an aliphatic radical free from water-solubilizing groups and being attached to the CO group above shown either directly or through the agency of an O, S or N atom; R' is an alkyl radical, or an alkylene radical carrying an additional group of the form R—CO—NH, as above defined, while X is halogen, for instance chlorine or bromine.

The requisite methylene halide compounds which form the initial material for my process may themselves be prepared by reacting the corresponding secondary acylamide with formaldehyde and dry hydrogen halide, according to the procedure, for instance, described in U. S. Patent No. 2,131,362 or in British Patents Nos. 492,699, 494,761, and 501,480.

The reaction of the chloromethyl amide and the inorganic base is best carried out in the same solvent in which the reaction of the amide and formaldehyde has been carried out; that is, in benzene, toluene, carbon tetrachloride, cyclohexane, aliphatic hydrocarbons, and other similar solvents. As inorganic bases which may be used for my invention the following may be mentioned as convenient: Sodium carbonate, potassium carbonate, sodium- or potassium-hydroxide, magnesium oxide, lime, calcium carbonate, sodium bicarbonate, or any other inorganic base which will not form a quaternary compound. Of course, sufficient water should be present in the alkali or should be added to the reaction mass to provide for the requisite exchange of OH for Cl, according to the following typical equation:

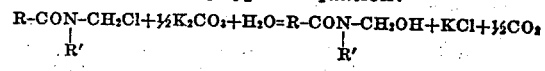

The reaction is carried out by agitating the solution of the halogen methyl compound with a considerable excess, usually, of the basic material at room temperature. Some heat of reaction is usually evolved and some cooling is necessary.

When the solvent layer becomes free of halogen, the reaction is complete. The product is recovered by filtering out the inorganic salts and evaporating off the solvent.

If R in the above formula contains a long chain, say an alkyl radical, saturated or unsaturated, of 7 to 29 carbon atoms, the product is a low melting wax and is quite soluble in organic solvents like benzene and carbon tetrachloride. This is a marked difference over the insolubility of the methylol compounds derived from primary amides, and therefore makes the novel compounds much more useful as agents for imparting softness or water-repellency to textile fiber from organic solution.

The novel organic compounds of this invention react readily with phosphorus trihalides, to produce compounds which after a series of rearrangements give phosphonic acids of the general formula

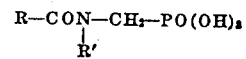

in the same manner as the primary methylol amides behave according to copending application of Engelmann & Pikl, Serial No. 322,766. Thus, in the case of the compound derived from methyl-stearamide, the series of transformations may be indicated by the following equations:

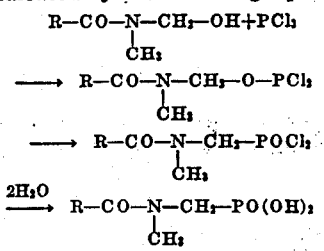

These transformers may be used to identify the novel compounds, and the resulting phosphonic acids may be employed as softening and water-repellency agents for textile fiber applicable for aqueous bath.

Without limiting my invention to any particular procedure, the following examples are given to illustrate my preferred mode of operation. Parts mentioned are by weight.

Example 1

70 parts of chloromethyl-methyl stearamide

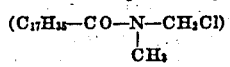

were dissolved in 200 parts of benzene, and then 40 parts of commercial potassium carbonate (containing 15% moisture) were added, and the mixture was agitated for 10 hours at room temperature. The potassium chloride and excess carbonate were filtered off, and the benzene filtrate was evaporated in vacuo. The product was a waxy solid, which was shown by the phosphonic acid test to be a methylol compound of the probable formula

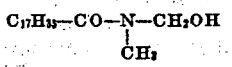

which may be named N-methyl-stearamido-methanol.

Cotton cloth was impregnated with a 2% solution of this product in carbon tetrachloride and then heated to 120 to 150° C. for a few minutes. The material acquired strong water-repellent properties and lost only little of it on washing with soap.

If the cloth was pretreated with a small amount of an acid like oxalic, citric, glycollic, or acetic acid the water-repellency was decidedly improved.

Example 2

To 100 parts of the reaction product of octadecyl carbamate, formaldehyde and hydrogen chloride which was dissolved in 200 parts of carbon tetrachloride, there were added 50 parts of calcium hydroxide (which has been exposed to most air), and the mass was agitated at room temperature for 6 hours. After this time the carbon tetrachloride solution was filtered and evaporated. The waxy mass which remained was free of halogen. When applied from a benzene solution to cloth and then subjected to a heat treatment at 120 to 150° C. the cloth became strongly water-repellent.

The product obtained above was probably mostly the N,N'-methylene-bis-(octadecyl-carbamido-methanol) of the following formula:

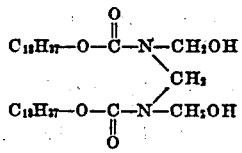

Example 3

550 parts of methylene distearamide were reacted with 120 parts of paraformaldehyde in 1700 parts of carbon tetrachloride, by passing in a stream of hydrogen chloride at 60° C.

When the chloromethyl compound was formed the aqueous layer was separated and the carbon tetrachloride solution cooled at 20° C. and treated with 450 parts of commercial potassium carbonate (containing 15% moisture). Some cooling is necessary at the beginning to keep the temperature around 20° C. After standing for 24 hours the carbon tetrachloride solution was neutral towards Congo red paper and was filtered. The filtrate presumably contained N,N'-methylene-bis(stearamido-methanol).

A solution of this product in $CCl_4$ was prepared which contained 1% active ingredient, and then small amounts of various auxiliary agents were added to different samples of this solution. Pieces were impregnated with these solutions and then subjected to a heat treatment at 120 to 150° C. The best water-repellency was obtained when the solution contained as auxiliary agent a small amount of $PCl_3$ (1 drop per pound of solution) thionyl chloride, stearamidomethyl phosphonic acid, stearamido-methyl pyridinium chloride, chloromethyl stearamide, or even mineral acid. The amount of these agents was varied from mere traces in the case of $PCl_3$ up to about 20% of the active ingredient in the case of the phosphonic acid, but it was always kept down to such a concentration that no tendering of the fabric was caused.

Example 4

90 parts of stearamide were reacted in 200 parts of carbon tetrachloride with 26 parts of paraformaldehyde and hydrogen chloride at 60° C.

After a clear solution was obtained the excess hydrogen chloride was blown out by a stream of dry air and the solution was then reacted at room temperature with 50 parts of sodium bicarbonate. After 10 hours, the solution was neutral to Congo red paper and the inorganic salts were filtered off.

The resulting product had similar properties to the product described in Example 3. Presumably, the action of hydrogen chloride and paraformaldehyde upon stearamide produces essentially methylene bis-(stearamido-methylene chloride), which was then converted into the corresponding bis-methylol compound.

In the above experiment the sodium bicarbonate may be replaced with slightly moist magnesium oxide, moist barium carbonate or calcium carbonate with the same results.

Instead of stearamide, palmitic acid amide, montanic acid amide, and amides from coconut oil acid as well as acids from the paraffin oxidation may be used with similar results. Similar results may also be obtained by using octadecyl urea ($C_{18}H_{37}NH$—$CONH_2$) or stearoyl urea ($C_{17}H_{35}$—$CONH$—$CONH_2$) instead of the stearamide above.

I claim:
1. The compounds of the general formula

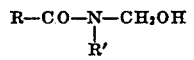

wherein R is an aliphatic radical free from water-solubilizing groups and attached to the CO group through the agency of an atom selected from the group consisting of carbon, oxygen, sulfur and nitrogen, while R' is a radical of the group consisting of the alkyl radicals and alkylene radicals carrying a further group of the form $$R-CO-N(R')-CH_2OH$$

as above defined.

2. A water-repellency agent being a compound as defined in claim 1, wherein R carries an alkyl chain of at least 7 carbon atoms.

3. A compound of the general formula $$Alk-CO-N(R')-CH_2OH$$

wherein Alk stands for an alkyl radical having from 7 to 29 carbon atoms, while R' designates an alkyl radical.

4. A compound of the general formula $$Alk-CO-N(R')-CH_2OH$$
$$Alk-CO-N(R')-CH_2OH$$

wherein Alk stands for an alkyl radical having from 7 to 29 carbon atoms, while R' designates an alkylene radical.

5. A compound of the general formula $$Alk-O-CO-N(R')-CH_2OH$$
$$Alk-O-CO-N(R')-CH_2OH$$

wherein Alk stands for an alkyl radical having from 7 to 29 carbon atoms, while R' designates an alkylene radical.

6. N-methyl-stearamido-methanol.
7. N,N'-methylene bis-(stearamido-methanol).
8. N,N'-methylene-bis(octadecyl-carbamido-methanol).

9. A process of preparing an N-methylol derivative of a secondary organic amide, which comprises reacting with an inorganic alkaline reagent in the presence of moisture upon a secondary organic amido-methylene halide compound of the general formula $$R-CO-N(R')-CH_2X$$

wherein R is an aliphatic radical free from water-solubilizing groups, X is a halogen atom, while R' stands for a radical of the group consisting of the methyl radicals and methylene radicals carrying a further group of the form $$R-CO-N(R')-CH_2X$$

as above defined.

10. A process as in claim 9, wherein R is an aliphatic radical containing an alkyl group of at least 7 carbon atoms, and is attached to the CO group shown by the agency of an atom selected from the group consisting of carbon, oxygen, sulfur and nitrogen.

11. The process which comprises reacting with an inorganic alkaline agent in the presence of moisture upon N-methyl-stearamido-methylene chloride.

12. The process which comprises reacting with an inorganic alkaline agent in the presence of moisture upon N,N'-methylene-bis(stearamido-methylene chloride).

13. The process which comprises reacting with an inorganic alkaline agent in the presence of moisture upon N,N'-methylene-bis(octadecoxy-carbamido-methylene chloride).

JOSEF PIKL.

CERTIFICATE OF CORRECTION.

Patent No. 2,306,185.  December 22, 1942.

JOSEF PIKL.

It is hereby certified that error appears in the printed specification of the above numbered patent requiring correction as follows: Page 2, second column, line 21, after "Pieces" insert --of cotton--; and that the said Letters Patent should be read with this correction therein that the same may conform to the record of the case in the Patent Office.

Signed and sealed this 16th day of February, A. D. 1943.

(Seal)

Henry Van Arsdale,
Acting Commissioner of Patents.